(12) United States Patent
Zhu et al.

(10) Patent No.: US 10,871,792 B1
(45) Date of Patent: Dec. 22, 2020

(54) LARGE-CURRENT POWER SUPPLY AND CONSTANT-CURRENT CONTROL METHOD AND SYSTEM THEREOF

(71) Applicant: Wenzhou University, Wenzhou (CN)

(72) Inventors: Xiang'ou Zhu, Wenzhou (CN); Yu Xu, Wenzhou (CN); Zhiwen He, Wenzhou (CN); Yuxing Dai, Wenzhou (CN)

(73) Assignee: Wenzhou University

( * ) Notice: Subject to any disclaimer, the term of this patent is extended or adjusted under 35 U.S.C. 154(b) by 0 days.

(21) Appl. No.: 16/564,607

(22) Filed: Sep. 9, 2019

(30) Foreign Application Priority Data

Jul. 2, 2019 (CN) .......................... 2019 1 0588330

(51) Int. Cl.
*G05F 1/62* (2006.01)
*G05F 1/565* (2006.01)
*G05F 1/569* (2006.01)
*G05F 1/563* (2006.01)
*G05F 1/573* (2006.01)

(52) U.S. Cl.
CPC ................ *G05F 1/565* (2013.01); *G05F 1/62* (2013.01); *G05F 1/563* (2013.01); *G05F 1/569* (2013.01); *G05F 1/573* (2013.01)

(58) Field of Classification Search
CPC .......... G05F 1/563; G05F 1/565; G05F 1/569; G05F 1/573; G05F 1/62; H02M 7/48; H02M 7/538; H02M 2001/007; H02M 2001/0045
USPC ........................................................ 323/266
See application file for complete search history.

(56) References Cited

U.S. PATENT DOCUMENTS

| | | | | |
|---|---|---|---|---|
| 5,570,276 A | * | 10/1996 | Cuk ...................... | H02M 3/005 323/266 |
| 8,724,356 B2 | * | 5/2014 | Pan ........................ | H02M 7/48 323/266 |
| 9,209,697 B2 | * | 12/2015 | Uno ................... | H02M 3/33507 |
| 9,893,546 B2 | * | 2/2018 | Saji ................... | H02M 3/33507 |
| 10,148,186 B2 | * | 12/2018 | Gao ....................... | H02M 3/158 |
| 10,186,944 B2 | * | 1/2019 | Lin ........................ | H02M 1/36 |

* cited by examiner

*Primary Examiner* — Yemane Mehari
(74) *Attorney, Agent, or Firm* — Lerner, David, Littenberg, Krumholz & Mentlik, LLP (57) ABSTRACT

Disclosed is a system and method for large-current power supply and constant-current control. Large-current power supply includes: primary power supply, energy-feedback circuit and direct-current (DC) large-current generator; energy-feedback circuit includes freewheel diode and magnetic reset winding; and secondary coil of DC large-current generator is connected to load. Without output rectifier diode and filter capacitor at load end of large-current power supply provided herein, power consumption problem of output rectifier diode at large current is unnecessarily considered, and electrolytic capacitor is not needed for filtration; and therefore, service life of power supply is greatly prolonged, larger current is output by extending, and power supply has advantages of simple circuit, small size, easy control and high working reliability. By adopting control method and system provided herein, an output voltage of Buck circuit in primary power supply is accurately controlled, and thus large-current power supply obtains a constant output current at load end.

8 Claims, 4 Drawing Sheets

FIG. 6 ized photovoltaic grid-connected system, a great number of DC combiner boxes and DC power distribution cabinets are provided, and thus lots of DC breakers are required. Along with the rapid development of photovoltaic power generation, a higher demand on protection performance is pushed forward for the DC breaker. For an urban rail transit, it is necessary to build a DC traction substation every two kilometers along a line, where each substation includes 10-12 sets of DC power devices with the DC breaker, and each DC breaker mainly functions as overcurrent protection, overvoltage protection, thermal protection, etc. As can be seen, with the rapid development of DC systems such as high-voltage DC power transmission technology, photovoltaic power generation and urban rail transit, a lot of DC breakers are required. Moreover, the DC breaker takes control and protection effects in a DC system, and its performance is crucial for secure and reliable operation of the DC system. Therefore, testing a protection characteristic of the DC breaker is of great significance to prevent fault and accident expansion of the DC system and to guarantee stable operation of the DC system.

LARGE-CURRENT POWER SUPPLY AND CONSTANT-CURRENT CONTROL METHOD AND SYSTEM THEREOF

CROSS REFERENCE TO RELATED APPLICATIONS

This application claims priority from Chinese application number 201910588330.X, filed Jul. 2, 2019, the disclosure of which is hereby incorporated herein by reference.

TECHNICAL FIELD

The present invention relates to the field of low-voltage electrical appliances, and in particular to a large-current power supply and a constant-current control method and system thereof.

BACKGROUND

As an important protected electrical appliance of a converter station in a direct-current (DC) power transmission system, a DC breaker is able to overhaul the system and process an occurred fault without power outage to guarantee the normal work of the system. For a DC combiner box and a DC power distribution cabinet in a photovoltaic power station, the DC breaker mainly serves as a switch, and its main functions are overcurrent protection and isolation, and are to provide selective protection for a fault in a branch switch. Particularly in a central A current required by a short-circuit instantaneous protection characteristic test of the DC breaker is very large and ranges from hundreds of amperes to tens of thousands of amperes. The existing protection characteristic test apparatus of the DC breaker mostly is a system having a power supply and a load or a system in which an alternating-current (AC) power supply is rectified into a DC. Because of an external load system, the former has the problems of large size, heavy weight and troublesome operation and thus is disadvantageous to a mobile test. The later has the problems of unstable output current, difficult control and large current ripple; and in the process when the AC is rectified into the DC, an output rectifier diode is needed to cause difficult rectification and filtration, and the power consumption of the rectifier diode at a large current is very high.

SUMMARY

An objective of the present invention is to provide a large-current power supply and a control method and system thereof. Without an output rectifier diode and a filter capacitor at a load end of the large-current power supply, the power consumption problem of the output rectifier diode at a large current is unnecessarily considered, and the large-current power supply can obtain a constant output current at the load end.

To achieve the above purpose, the present invention provides the following solution.

A large-current power supply includes: a primary power supply, an energy-feedback circuit and a DC large-current generator, where the energy-feedback circuit includes a freewheel diode and a magnetic reset winding, an anode of the freewheel diode is connected to a first end of the magnetic reset winding, a cathode of the freewheel diode is connected to a first end of a primary coil of the DC large-current generator, and a second end of the primary coil is connected to a second end of the magnetic reset winding, where the first end of the magnetic reset winding and the first end of the primary coil are a homonymous end to each other; and a positive output end of the primary power supply is connected to the first end of the primary coil, a negative output end of the primary power supply is connected to the second end of the primary coil, and a secondary coil of the DC large-current generator is connected to a load.

Optionally, the primary power supply includes a Buck circuit and a DC power supply, and the DC power supply is connected to an input end of the Buck circuit.

A constant-current control method for a large-current power supply is used for the power supply and includes:

obtaining a unit step response coefficient dataset of an output current from a pulse-width modulation (PWM) controller to the power supply, where the PWM controller is configured to control a working state of a switch tube for a Buck circuit;

determining a dynamic matrix according to the unit step response coefficient dataset, where an element in the dynamic matrix is a unit step response coefficient in the unit step response coefficient dataset;

determining a predictive control model of the power supply according to the dynamic matrix, a control increment sequence, and an output current of the power supply under the action of a current control quantity; and controlling the working state of the switch tube for the Buck circuit in the power supply according to an output current predicted by the predictive control model, so that the output current of the power supply is maintained at an expected value.

A constant-current control system for a large-current power supply is used for the power supply and includes:

a dataset obtaining module, configured to obtain a unit step response coefficient dataset of an output current from a PWM controller to the power supply, where the PWM controller is configured to control a working state of a switch tube for a Buck circuit;

a dynamic matrix determination module, configured to determine a dynamic matrix according to the unit step response coefficient dataset, where an element in the dynamic matrix is a unit step response coefficient in the unit step response coefficient dataset;

a predictive model determination module, configured to determine a predictive control model of the power supply according to the dynamic matrix, a control increment sequence, and an output current of the power supply under the action of a current control quantity; and a control module, configured to control the working state of the switch tube for the Buck circuit in the power supply according to an output current predicted by the predictive control model, so that the output current of the power supply is maintained at an expected value.

According to specific embodiments provided in the present invention, the present invention discloses the following technical effects:

A large-current power supply provided by the present invention includes: a primary power supply, an energy-feedback circuit and a DC large-current generator; the energy-feedback circuit includes a freewheel diode and a magnetic reset winding; an anode of the freewheel diode is connected to a first end of the magnetic reset winding, a cathode of the freewheel diode is connected to a first end of a primary coil of the DC large-current generator, and a second end of the primary coil is connected to a second end of the magnetic reset winding, where the first end of the magnetic reset winding and the first end of the primary coil are a homonymous end to each other; and a positive output end of the primary power supply is connected to the first end of the primary coil, a negative output end of the primary power supply is connected to the second end of the primary coil, and a secondary coil of the DC large-current generator is connected to a load. Without an output rectifier diode and a filter capacitor at a load end of the large-current power supply provided by the present invention, the power consumption problem of the output rectifier diode at a large current is unnecessarily considered, and an electrolytic capacitor does not need to be used for filtration; and therefore, the service life of the power supply is greatly prolonged, a larger current is output easily by extending, and the power supply has the advantages of simple circuit, small size, easy control and high working reliability.

A constant-current control method for a large-current power supply provided by the present invention includes: obtaining a unit step response coefficient dataset of an output current from a PWM controller to the power supply; determining a dynamic matrix according to the unit step response coefficient dataset; determining a predictive control model of the power supply according to the dynamic matrix, a control increment sequence, and an output current of the power supply under the action of a current control quantity; and controlling a working state of a switch tube for a Buck circuit in the power supply according to an output current predicted by the predictive control model, so that the output current of the power supply is maintained at an expected value. By adopting the control method and system provided by the present invention, an output voltage of the Buck circuit in a primary power supply can be accurately controlled, and thus the large-current power supply obtains a constant output current at a load end.

BRIEF DESCRIPTION OF THE DRAWINGS

To describe the technical solutions in the embodiments of the present invention or in the prior art more clearly, the following briefly describes the accompanying drawings required for describing the embodiments. Apparently, the accompanying drawings in the following description show some embodiments of the present invention, and a person of ordinary skill in the art may still derive other drawings from these accompanying drawings without creative efforts.

DETAILED DESCRIPTION

The following clearly and completely describes the technical solutions in the embodiments of the present invention with reference to the accompanying drawings in the embodiments of the present invention. Apparently, the described embodiments are merely a part rather than all of the embodiments of the present invention. All other embodiments obtained by a person of ordinary skill in the art based on the embodiments of the present invention without creative efforts shall fall within the protection scope of the present invention.

An objective of the present invention is to provide a large-current power supply and a control method and system thereof. Without an output rectifier diode and a filter capacitor at a load end of the large-current power supply, the power consumption problem of the output rectifier diode at a large current is unnecessarily considered, and the large-current power supply can obtain a constant output current at the load end.

To make the foregoing objective, features, and advantages of the present invention clearer and more comprehensible, the present invention is further described in detail below with reference to the accompanying drawings and specific embodiments.

Figure 1:
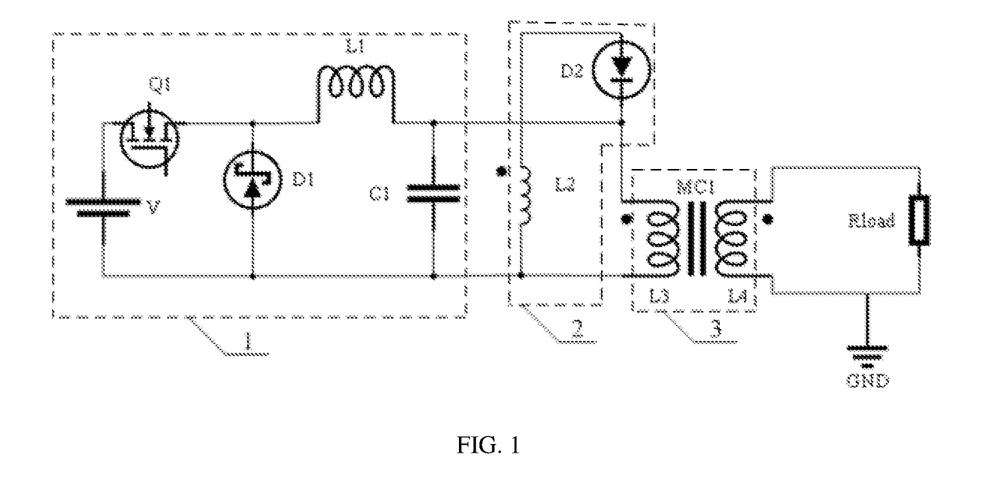
FIG. 1 is a circuit diagram of a large-current power supply provided by an embodiment of the present invention.

FIG. 1 is a circuit diagram of a large-current power supply provided by an embodiment of the present invention. As shown in FIG. 1, the power supply includes: a primary power supply 1, an energy-feedback circuit 2 and a DC large-current generator 3.

The energy-feedback circuit includes a freewheel diode D2 and a magnetic reset winding L2, an anode of the freewheel diode D2 is connected to a first end of the magnetic reset winding L2, a cathode of the freewheel diode D2 is connected to a first end of a primary coil L3 of the DC large-current generator, and a second end of the primary coil L3 is connected to a second end of the magnetic reset winding L2, where the first end of the magnetic reset winding L2 and the first end of the primary coil L3 are a homonymous end to each other.

A positive output end of the primary power supply is connected to the first end of the primary coil L3, a negative output end of the primary power supply is connected to the second end of the primary coil L3, and a secondary coil L4 of the DC large-current generator is connected to a load Rload.

In this embodiment, the primary power supply includes a Buck circuit and a DC power supply V, and the DC power supply V is connected to an input end of the Buck circuit. The DC power supply V, a switch tube Q1, a power diode D1, an inductor L1 and a capacitor C1 are formed into the primary power supply 1, and the primary power supply 1 mainly provides energy for the large-current power supply. The DC large-current generator MC1 is connected to the load Rload, and the load Rload is a DC breaker.

For the characteristics of large power output current and short duration (millisecond level) of a short-circuit instantaneous protection characteristic test apparatus of the DC breaker, the present invention provides a large-current pulse power supply without an output rectifier diode. When the large-current power supply provided by the present invention is used to carry out a short-circuit instantaneous protection characteristic test of the DC breaker, the working process is as follows:

A PWM wave is used to control a switch tube Q1 of a primary power supply to connect and disconnect, so that a periodically-changing output voltage is obtained at an output end of the primary power supply and then a changing voltage is obtained on a primary coil L3. As a result, a changing magnetic field is formed on a DC large-current generator MC1. The magnetic field is coupled to a secondary coil L4 to generate an inductive voltage. Since the secondary coil L4 is connected to the load Rload, and a loop formed by the secondary coil L4 and the load Rload has an extremely small impedance, a low voltage and a large current are generated on the load Rload. By controlling a change of the output voltage of the primary power supply reasonably, an inductive current obtained on the secondary coil L4 may be an expected constant current. The follow current and magnetic reset are completed by a freewheel diode D2 and a magnetic reset winding L2 to feed energy back to a power end.

Compared with 5-10 years of service life of other electronic components, the service life of an electrolytic capacitor is relatively short. The service life of a power supply depends on the service life of the electrolytic capacitor to a large extent. The service life of the electrolytic capacitor is mainly associated with an internal temperature and a ripple current of the electrolytic capacitor. Particularly, the electrolytic capacitor is heated seriously in case of a large current. According to an Arrhenius experience formula, the service life of the electrolytic capacitor is shortened by one time for every 10° C. increase in a working temperature.

According to the pulse power supply without the output rectifier diode provided by the present invention, without the output rectifier diode and a filter capacitor at a load end, the power consumption problem of the output rectifier diode at a large current is unnecessarily considered, and the electrolytic capacitor does not need to be used for filtration; and therefore, the service life of the power supply is greatly prolonged, a larger current is output easily by extending, and the large-current power supply provided by the present invention has the advantages of simple circuit, small power size, easy control and high working reliability.

Figure 2:
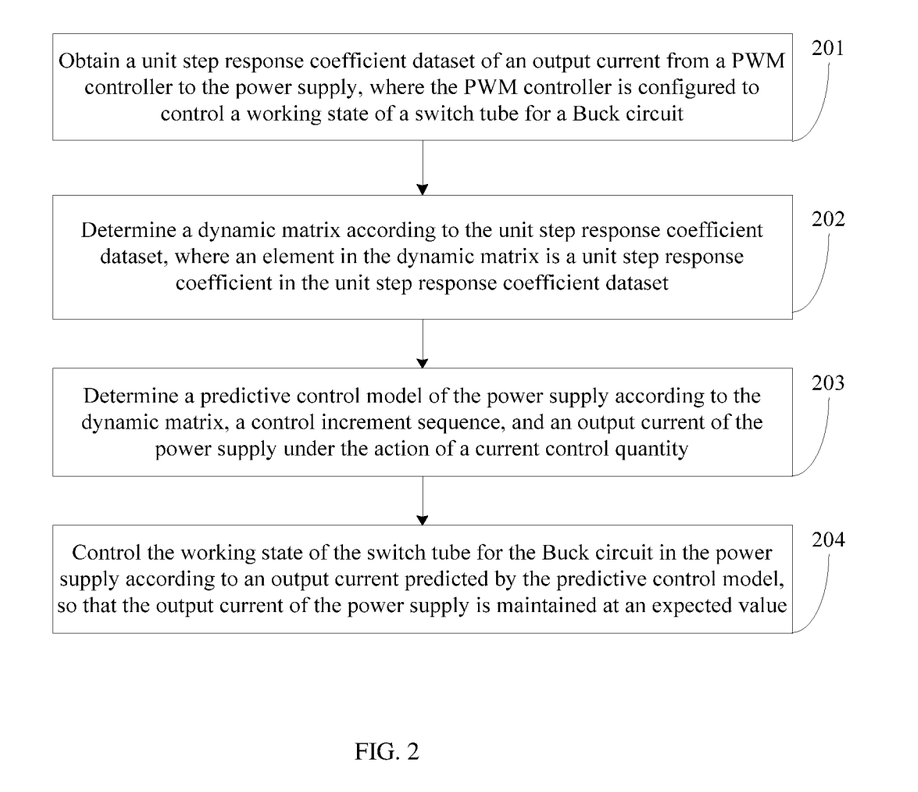
FIG. 2 is a flowchart of a constant-current control method for a large-current power supply provided by an embodiment of the present invention.

FIG. 2 is a flowchart of a constant-current control method for a large-current power supply provided by an embodiment of the present invention. As shown in FIG. 2, the control method is used for the power supply and includes the following steps:

Step 201: obtain a unit step response coefficient dataset of an output current from a PWM controller to the power supply, where the PWM controller is configured to control a working state of a switch tube for a Buck circuit. The unit step response coefficient dataset includes multiple linear-area unit step response coefficients and multiple nonlinear-area unit step response coefficients, where each linear-area unit step response coefficient is a unit step response coefficient of a DC large-current generator in a linear magnetic characteristic working area, and each nonlinear-area unit step response coefficient is a unit step response coefficient of the DC large-current generator in a saturated magnetic characteristic working area.

Step 202: determine a dynamic matrix according to the unit step response coefficient dataset, where an element in the dynamic matrix is a unit step response coefficient in the unit step response coefficient dataset. In order to control an output voltage of a Buck circuit of a primary power supply reasonably and accurately, and enable a load end of the power supply to obtain a constant output current, the magnetic characteristic of the DC large-current generator is fully considered by the present invention. The elements formed into the dynamic matrix include the multiple linear-area unit step response coefficients and the multiple nonlinear-area unit step response coefficients, so that the output current of the power supply can be accurate and controllable.

Step 203: determine a predictive control model of the power supply according to the dynamic matrix, a control increment sequence, and an output current of the power supply under the action of a current control quantity. An expression of the predictive control model is:

$Y_{PM}(k)=Y_{P0}(k)+A\Delta u_M(k)$, where the k represents a current sampling period, the $Y_{P0}(k)$ represents a matrix for a predictive output current value under the action of the current control quantity, $$Y_{P0}(k) = \begin{bmatrix} y_0(k+1) \\ \vdots \\ y_0(k+P) \end{bmatrix},$$

the $y_0(k+i)$ represents a predictive output current value of the power supply in an ith predictive time domain under the action of the current control quantity, $1 \le i \le P$, and the P represents a length of the predictive time domain; the A represents a dynamic matrix, $$A = \begin{bmatrix} a_1 & 0 & \cdots & 0 \\ a_2 & a_1 & \cdots & 0 \\ \vdots & & \ddots & \vdots \\ a_P & a_{P-1} & \cdots & a_{P-M+1} \end{bmatrix},$$

the $a_n$ represents a unit step response coefficient, and $1 \le n \le P$; the $A\Delta u_M(k)$ represents a control increment sequence, $$\Delta u_M(k) = \begin{bmatrix} \Delta u(k+1) \\ \vdots \\ \Delta u(k+M-1) \end{bmatrix},$$

the $\Delta u(k+i')$ represents a control increment for an i' th control time domain, $1 \le i' \le M-1$, and the M represents a length of the control time domain; and the $Y_{PM}(k)$ represents a matrix for a predictive output current value under the action of the control increment sequence, $$Y_{PM}(k) = \begin{bmatrix} y_M(k+1) \\ \vdots \\ y_M(k+P) \end{bmatrix},$$

and the $y_M(k+i'')$ represents a predictive output current value of an $i''$th predictive time domain under the action of a corresponding control increment, and $1 \leq i'' \leq P$.

Step 204: control the working state of the switch tube for the Buck circuit in the power supply according to an output current predicted by the predictive control model, so that the output current of the power supply is maintained at an expected value.

Due to nonlinearity, model mismatch and/or environmental interference and the like in reality, it is possible that the prediction based on an unchanging model cannot be completely matched with an actual condition. As a result, after the step 203, the predictive model is modified in a manner of weighing a predictive error in this embodiment, which specifically includes the following steps.

Obtain an actual output current value.

Solve a target function by using the following optimization algorithm:

$$\min J(k) = \sum_{i=1}^{P} q_i [w(k+i) - y_M(k+i)]^2 + \sum_{j=1}^{M} r_j \Delta u^2(k+j-1),$$

to obtain an optimal solution of the control increment sequence, where the $q_i$ represents a weight coefficient of an expected difference, the $r_j$ represents a weight coefficient of a control increment, and the $w(k+i)$ represents an expected output current value of the power supply in an ith predictive time domain.

Determine a predictive output current value according to the optimal solution of the control increment sequence and the predictive control model.

Determine the predictive error according to the predictive output current value and the actual output current value.

Correct the predictive control model according to the predictive error to obtain a corrected predictive control model. An expression of the corrected predictive control model is: $Y_{cor}(k+1) = Y_{PM}(k) + he(k+1)$, where the $Y_{cor}(k+1)$ represents a matrix of a corrected predictive output current value, the $h$ represents an error correction vector, and the $e(k+1)$ represents a predictive error.

Figure 3:
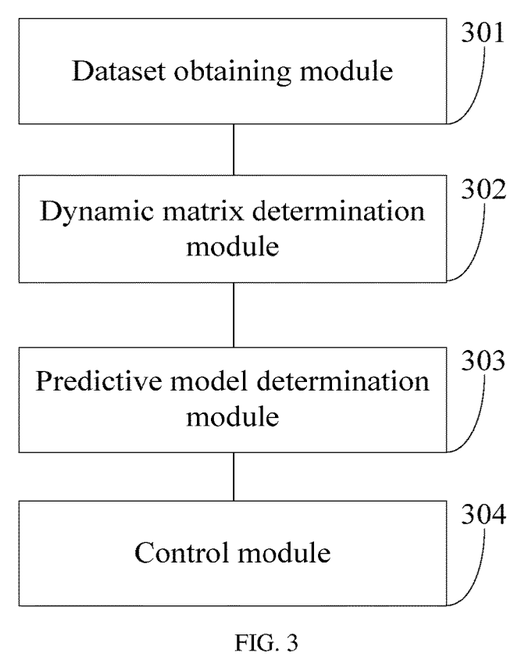
FIG. 3 is a structural block diagram of a constant-current control system for a large-current power supply provided by an embodiment of the present invention.

FIG. 3 is a structural block diagram of a constant-current control system for a large-current power supply provided by an embodiment of the present invention. As shown in FIG. 3, the control system is used for the power supply, and includes:

a dataset obtaining module 301, configured to obtain a unit step response coefficient dataset of an output current from a PWM controller to the power supply, where the PWM controller is configured to control a working state of a switch tube for a Buck circuit;

a dynamic matrix determination module 302, configured to determine a dynamic matrix according to the unit step response coefficient dataset, where an element in the dynamic matrix is a unit step response coefficient in the unit step response coefficient dataset;

a predictive model determination module 303, configured to determine a predictive control model of the power supply according to the dynamic matrix, a control increment sequence, and an output current of the power supply under the action of a current control quantity; and a control module 304, configured to control the working state of the switch tube for the Buck circuit in the power supply according to an output current predicted by the predictive control model, so that the output current of the power supply is maintained at an expected value.

Figure 4:
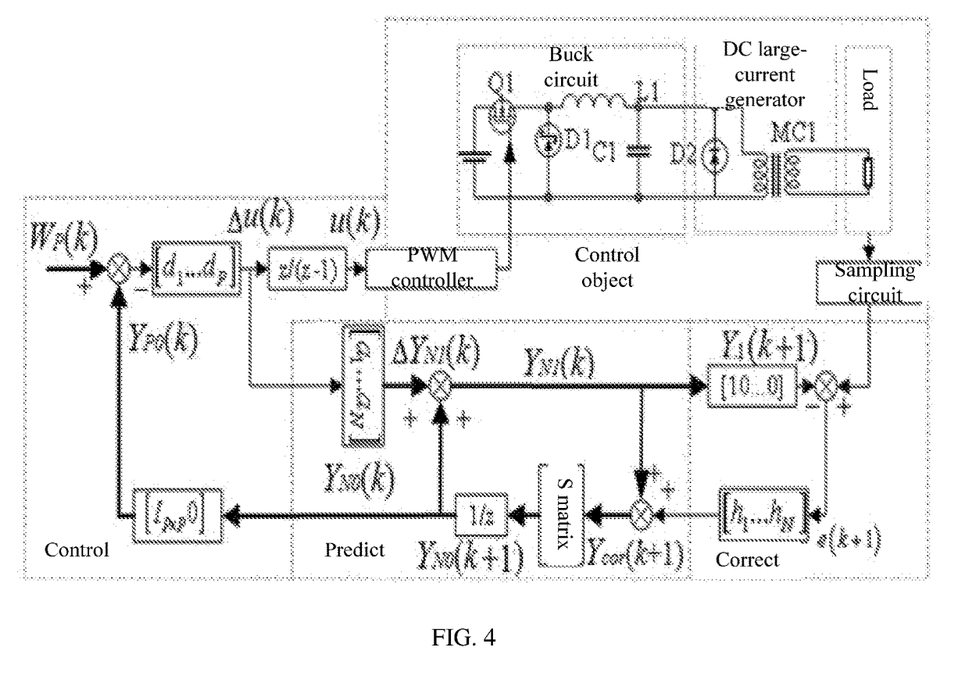
FIG. 4 is a schematic diagram of a constant-current control method for a large-current power supply provided by an embodiment of the present invention.
Figure 5:
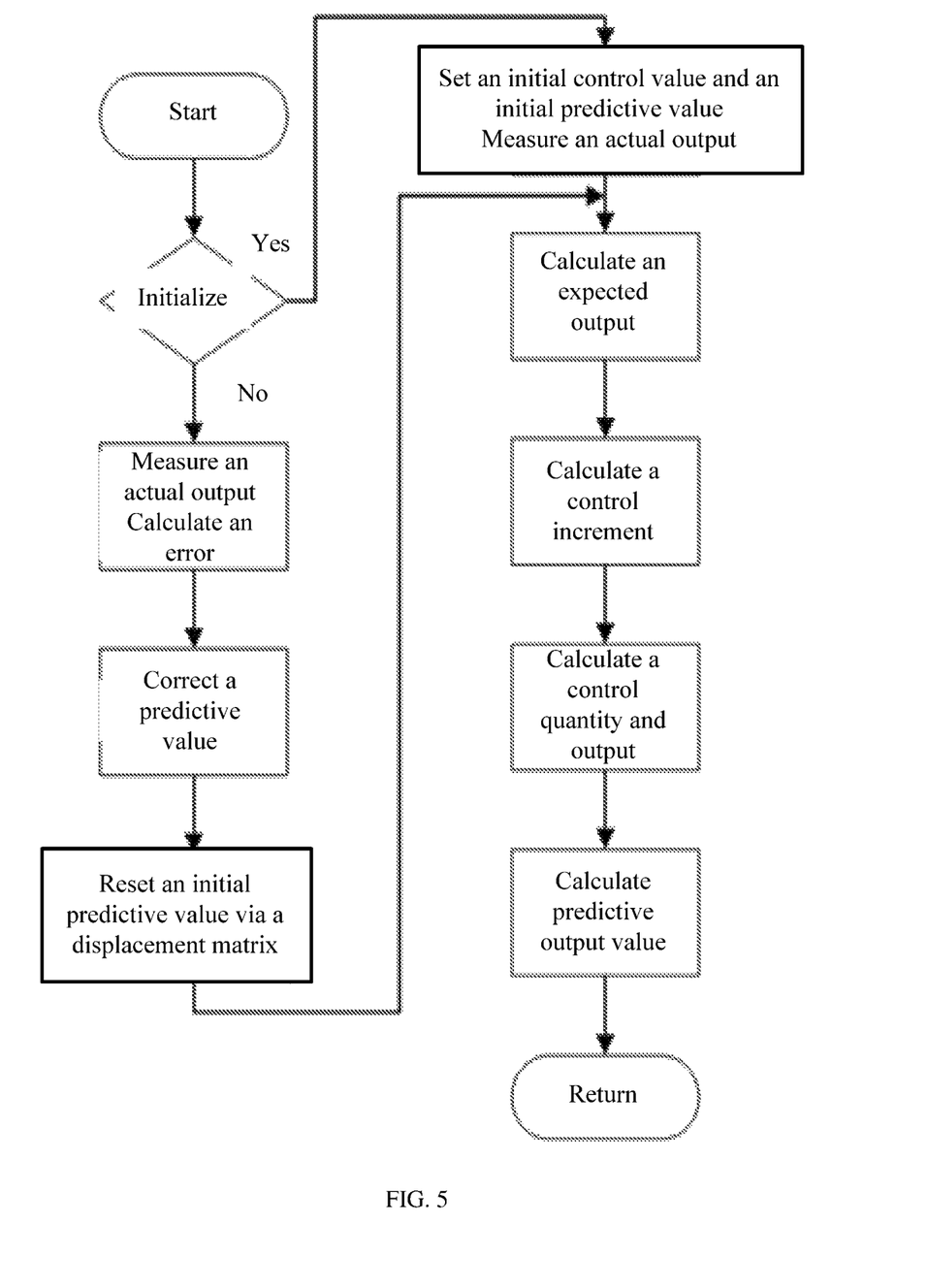
FIG. 5 is an implementation flowchart of a constant-current control method for a large-current power supply provided by an embodiment of the present invention.
Figure 6:
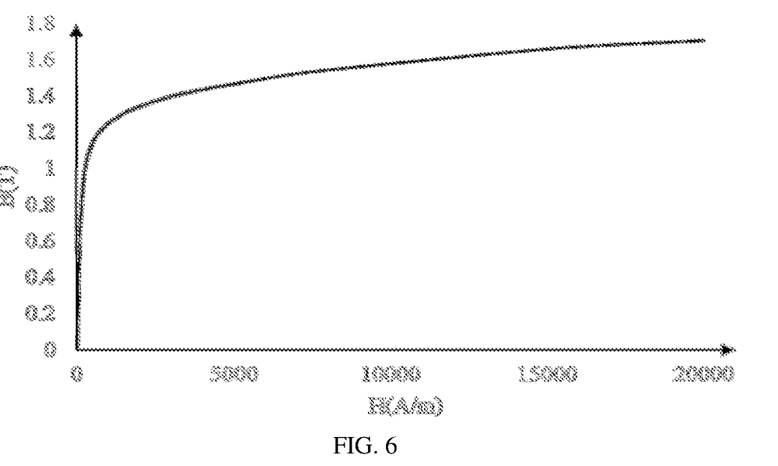
FIG. 6 is a magnetization curve graph provided by an embodiment of the present invention.

FIG. 4 is a schematic diagram of a constant-current control method for a large-current power supply provided by an embodiment of the present invention. FIG. 5 is an implementation flowchart of a constant-current control method for a large-current power supply provided by an embodiment of the present invention. As shown in FIG. 4 and FIG. 5, a specific implementation process of the constant-current control method of the large-current power supply is as follows:

(1) Manufacture a test sample, measure a magnetic characteristic of a DC large-current generator, and respectively measure a hysteresis loop at different magnetic field intensities. By recording a magnetic induction intensity B and a magnetic field intensity H on a vertex of each hysteresis loop, a table 1 is obtained, and a basic magnetization curve is as shown in FIG. 6.

TABLE 1

| B and H values on vortexes of hysteresis loops | | | | | | | | | |
|---|---|---|---|---|---|---|---|---|---|
| B (T) | 0.43 | 0.66 | 0.919 | 1.176 | 1.22 | 1.32 | 1.41 | 1.54 | 1.66 | 1.71 |
| H (A/m) | 60 | 100 | 200 | 600 | 800 | 1600 | 3200 | 8000 | 15000 | 20000 |

(2) Measure unit step response data of an output current from a PWM controller to the power supply to establish a predictive model. The function of the predictive model is to predict an output according to historical information of a controlled object and a future input. At a kth moment, supposing that the control action keeps unchanged, i.e., there is no control increment, an output in future N moments is an initial predictive current value: $y_0(k+1), \ldots, y_0(k+N)$, and then a predictive output current value of the system with the action of a control increment sequence $\Delta u(k)$ is:

$$Y_{N1}(k) Y_{N0}(k) + a\Delta u(k) \tag{1}$$

Where, $$Y_{N0}(k) = \begin{bmatrix} y_0(k+1) \\ \vdots \\ y_0(k+N) \end{bmatrix} \text{ and } Y_{N1}(k) = \begin{bmatrix} y_1(k+1) \\ \vdots \\ y_1(k+N) \end{bmatrix}$$

respectively are a predictive output current value of the power supply when no control increment is applied and a predictive output current value of the power supply after a control increment sequence $\Delta u(k)$ is applied, and the $a = [a_1, a_2 \ldots a_n]^T$ is a dynamic coefficient matrix of the system, namely a unit step response vector. Similarly, under the action of M control increments: $\Delta u(k), \Delta u(k+1), \ldots, \Delta u(k+M-1)$, a predictive output current value of the power supply in future P moments is:

$$Y_{PM}(k) = Y_{P0}(k) + A\Delta u_M(k) \tag{2}$$

Where, $$Y_{P0}(k) = \begin{bmatrix} y_0(k+1) \\ \vdots \\ y_0(k+P) \end{bmatrix}, \Delta u_M(k) = \begin{bmatrix} \Delta u(k+1) \\ \vdots \\ \Delta u(k+M-1) \end{bmatrix},$$

$$Y_{PM}(k) = \begin{bmatrix} y_M(k+1) \\ \vdots \\ y_M(k+P) \end{bmatrix},$$

and $$A = \begin{bmatrix} a_1 & 0 & \cdots & 0 \\ a_2 & a_1 & \cdots & 0 \\ \vdots & & \ddots & \vdots \\ a_P & a_{P-1} & \cdots & a_{P-M+1} \end{bmatrix}$$

respectively are a dynamic matrix consisting of a step response coefficient of the system, the P is a length of a predictive time domain, the M is a length of a control time domain, the N is a length of a model time domain, and the P and the M meet a condition: M≤P≤N.

(3) Determine a control increment in a future series of moments by rolling optimization, where a future control increment is mainly determined by optimizing a performance index. A target function is optimized as:

$$\min J(k) = \sum_{i=1}^{P} q_i [w(k+i) - y_M(k+i)]^2 + \sum_{j=1}^{M} r_j \Delta u^2(k+j-1) \quad (3)$$

Where, the $q_i$ and the $r_j$ respectively are a weight coefficient, the w(k+i) is an expected output current, the Δu(k+j−1) is a control increment of a future (j−1)th control time domain, and the y(k+i) represents a predictive output current value of an ith predictive time domain.

Supposing $$Q = \mathrm{diag}(q_1, q_2, \ldots, q_P) R = \mathrm{diag}(r_1, r_2, \ldots, r_M) \text{ and}$$

$$W_P(k) = \begin{bmatrix} w(k+1) \\ \vdots \\ w(k+P) \end{bmatrix},$$

the optimized target function is written into a matrix form:

$$\min J(k) = [W_P(k) - Y_{PM}(k)]^T Q[W_P(k) - Y_{PM}(k)] + \Delta u(k) R \Delta u_M(k) \quad (4)$$

Within k sampling periods, for a known and determined system, since the $W_P(k)$ and the $Y_{PM}(k)$ are known, under a condition in which an input and an output are not constrained, supposing ∂J(k)/∂Δu$_M$(k)=0, the following may be obtained:

For a known and determined power system, the A, Q and R matrixes, the optimized time domain P and the control time domain M may be obtained via calculation or parameter design. By calculating according to a formula (5), a value of the $d^T$ may be obtained and thus the control increment sequence Δu(k) is obtained.

$$d^T = [1 \ 0 \ \ldots \ 0](A^T Q A + R)^{-1} A^T Q = [d_1 \ d_2 \ \ldots \ d_P] \quad (5)$$

$$\Delta u(k) = [1 \ 0 \ \ldots \ 0]\Delta u_M(k) = d^T[W_P(k) - Y_{P0}(k)] \quad (6)$$

(4) Compensate and modify the predictive model by feedback correction. Due to nonlinearity, model mismatch, environmental interference and the like in actual applications, it is impossible that the prediction based on an unchanging model is completely matched with an actual condition. As a result, a defect of the predictive model should be compensated by using other means, or a basic model is modified online. In this embodiment, the predictive model is modified in a manner of weighing a predictive error. A modification formula is:

$$Y_{cor}(k+1) = Y_{N1}(k) + he(k+1) \quad (7)$$

$$e(k+1) = y(k+1) - y_1(k+1) \quad (8)$$

Where, the $Y_{cor}=[y_{cor}(k+1) \ldots y_{cor}(k+N)]^T$ is a predictive output current, after the error is correct at a t=(k+1)T sampling moment, at the t=(k+i)T sampling moment, the T represents a sampling period, the $h=[h_1 \ldots h_N]^T$ is an error correction vector, the $h_i$ is a modified weight coefficient and represents a weight coefficient for correcting an error of a predictive value at different sampling moments, $h_1=1$, and the e(k+1) is a predictive error which is a difference value between an actual output current value and the predictive output current. Through a displacement matrix, a predictive output current value of a corrected predictive model is obtained:

$$Y_{N0}(k+1) = S Y_{cor}(k+1) \quad (9)$$

Where, the S is a displacement matrix, and $$S = \begin{bmatrix} 0 & 1 & 0 & 0 & \cdots & 0 & 0 \\ 0 & 0 & 1 & 0 & \cdots & 0 & 0 \\ \vdots & & & & \ddots & & \vdots \\ 0 & 0 & 0 & 0 & \cdots & 0 & 1 \\ 0 & 0 & 0 & 0 & \cdots & 0 & 1 \end{bmatrix}.$$

After a predictive current value of a current predictive period is obtained, a new round of optimization may be started. The control process of dynamic matrix control (DMC) is implemented by predicting, optimizing, correcting, predicting, and circulating online over time.

By adopting the control method and system provided by the present invention, an output voltage of a Buck circuit in a primary power supply can be accurately controlled, and thus the large-current power supply obtains a constant output current at a load end. Therefore, the control method and system are of great importance to control a power supply of a short-circuit instantaneous protection characteristic test apparatus of a DC breaker.

Each embodiment of the present specification is described in a progressive manner, each embodiment focuses on the difference from other embodiments, and the same and similar parts between the embodiments may refer to each other.

Several examples are used for illustration of the principles and implementation methods of the present invention. The description of the embodiments is used to help illustrate the method and its core principles of the present invention. In addition, those skilled in the art can make various modifications in terms of specific embodiments and scope of application in accordance with the teachings of the present invention. In conclusion, the content of this specification shall not be construed as a limitation to the invention.

What is claimed is:

1. A large-current power supply, comprising: a primary power supply, an energy-feedback circuit and a direct-current (DC) large-current generator, wherein
   the energy-feedback circuit comprises a freewheel diode and a magnetic reset winding, an anode of the freewheel diode is connected to a first end of the magnetic reset winding, a cathode of the freewheel diode is connected to a first end of a primary coil of the DC large-current generator, and a second end of the primary coil is connected to a second end of the magnetic reset winding, wherein the first end of the magnetic reset winding and the first end of the primary coil are a homonymous end to each other; wherein, the freewheel diode and the magnetic reset winding completes follow current and magnetic reset to feed energy back to a power end; and
   a positive output end of the primary power supply is connected to the first end of the primary coil, a negative output end of the primary power supply is connected to the second end of the primary coil, and a secondary coil of the DC large-current generator is connected to a load, and the load is a DC breaker.

2. The power supply according to claim 1, wherein the primary power supply comprises a Buck circuit and a DC power supply, and the DC power supply is connected to an input end of the Buck circuit.

3. A constant-current control method for a large-current power supply which comprises:
   obtaining a unit step response coefficient dataset of an output current from a pulse-width modulation (PWM) controller to the power supply, wherein the PWM controller is configured to control a working state of a switch tube for a Buck circuit;
   determining a dynamic matrix according to the unit step response coefficient dataset, wherein an element in the dynamic matrix is a unit step response coefficient in the unit step response coefficient dataset;
   determining a predictive control model of the power supply according to the dynamic matrix, a control increment sequence, and an output current of the power supply under the action of a current control quantity; and
   controlling the working state of the switch tube for the Buck circuit in the power supply according to an output current predicted by the predictive control model, so that the output current of the power supply is maintained at an expected value.

4. The control method according to claim 3, wherein the unit step response coefficient dataset comprises multiple linear-area unit step response coefficients and multiple non-linear-area unit step response coefficients, wherein each linear-area unit step response coefficient is a unit step response coefficient of a DC large-current generator in a linear magnetic characteristic working area, and each non-linear-area unit step response coefficient is a unit step response coefficient of the DC large-current generator in a saturated magnetic characteristic working area.

5. The control method according to claim 4, wherein the elements formed into the dynamic matrix comprise the multiple linear-area unit step response coefficients and the multiple nonlinear-area unit step response coefficients.

6. The control method according to claim 5, wherein an expression of the predictive control model is:
$Y_{PM}(k)=Y_{P0}(k)+A\Delta u(k)$, wherein the k represents a current sampling period, the $Y_{P0}(k)$ represents a matrix for a predictive output current value under the action of the current control quantity, $$Y_{P0}(k) = \begin{Bmatrix} y_0(k+1) \\ \vdots \\ y_0(k+P) \end{Bmatrix},$$

the $y_0(k+i)$ represents a predictive output current value of the power supply in an ith predictive time domain under the action of the current control quantity, $1 \leq i \leq P$, and the P represents a length of the predictive time domain; the A represents a dynamic matrix, $$A = \begin{bmatrix} a_1 & 0 & \cdots & 0 \\ a_2 & a_1 & \cdots & 0 \\ \vdots & & \ddots & \vdots \\ a_P & a_{P-1} & \cdots & a_{P-M+1} \end{bmatrix},$$

the $a_n$ represents a unit step response coefficient, and $1 \leq n \leq P$; the $\Delta u_M(k)$ represents a control increment sequence, $$\Delta u_M(k) = \begin{Bmatrix} \Delta u(k+1) \\ \vdots \\ \Delta u(k+M-1) \end{Bmatrix},$$

the $\Delta u(k+i')$ represents a control increment for a i'th control time domain, $1 \leq i' \leq M-1$, and the M represents a length of the control time domain; the $Y_{PM}(k)$ represents a matrix for a predictive output current value under the action of the control increment sequence, $$Y_{PM}(k) = \begin{Bmatrix} y_M(k+1) \\ \vdots \\ y_M(k+P) \end{Bmatrix},$$

and the $y_M(k+i'')$ represents a predictive output current value of an i''th predictive time domain under the action of a corresponding control increment, and $1 \leq i'' \leq P$.

7. The control method according to claim 6, after the determining a predictive control model of the power supply according to the dynamic matrix, a control increment sequence, and an output current of the power supply under the action of a current control quantity, further comprising:
   obtaining an actual output current value;
   solving a target function by using the following optimization algorithm:

$$\min J(k) = \sum_{i=1}^{P} q_i [w(k+i) - y_M(k+i)]^2 + \sum_{j=1}^{M} r_j \Delta u^2(k+j-1),$$

to obtain an optimal solution of the control increment sequence, wherein the $q_i$ represents a weight coefficient of an expected difference, the $r_j$ represents a weight coefficient of a control increment, and the w(k+i) represents an expected output current value of the power supply in an ith predictive time domain;

determining a predictive output current value according to the optimal solution of the control increment sequence and the predictive control model;

determining a predictive error according to the predictive output current value and the actual output current value; and correcting the predictive control model according to the predictive error to obtain a corrected predictive control model.

8. A constant-current control system for a large-current power supply, which comprises:

a dataset obtaining module, configured to obtain a unit step response coefficient dataset of an output current from a pulse-width modulation (PWM) controller to the power supply, wherein the PWM controller is configured to control a working state of a switch tube for a Buck circuit;

a dynamic matrix determination module, configured to determine a dynamic matrix according to the unit step response coefficient dataset, wherein an element in the dynamic matrix is a unit step response coefficient in the unit step response coefficient dataset;

a predictive model determination module, configured to determine a predictive control model of the power supply according to the dynamic matrix, a control increment sequence, and an output current of the power supply under the action of a current control quantity; and a control module, configured to control the working state of the switch tube for the Buck circuit in the power supply according to an output current predicted by the predictive control model, so that the output current of the power supply is maintained at an expected value.

* * * * *

UNITED STATES PATENT AND TRADEMARK OFFICE
CERTIFICATE OF CORRECTION

PATENT NO. : 10,871,792 B1
APPLICATION NO. : 16/564607
DATED : December 22, 2020
INVENTOR(S) : Xiang'ou Zhu et al.

Page 1 of 1

It is certified that error appears in the above-identified patent and that said Letters Patent is hereby corrected as shown below:

On the Title Page (73) Assignee:
"Wenzhou University, Wenzhou (CN)"
Should read:
--Wenzhou Power Supply Company, State Grid Zhejiang Electric Power Co., Ltd. Wenzhou City (CN);
Pingyang County Power Supply Company, State Grid Zhejiang Electric Power Co., Ltd., Aojiang Town (CN);
Wenzhou University, Wenzhou City (CN)--

Signed and Sealed this
Seventh Day of September, 2021

Drew Hirshfeld
*Performing the Functions and Duties of the*
*Under Secretary of Commerce for Intellectual Property and*
*Director of the United States Patent and Trademark Office*